US007670976B2

United States Patent
Lee et al.

(10) Patent No.: US 7,670,976 B2
(45) Date of Patent: Mar. 2, 2010

(54) HIGH STRAIN-POINT GLASS COMPOSITION FOR SUBSTRATE

(75) Inventors: Jin Hyuk Lee, Gyeonggi-do (KR); Si Moo Lee, Gyeonggi-do (KR); Jae Wook Lee, Gyeonggi-do (KR)

(73) Assignee: KCC Corporation, Seoul (KR)

( * ) Notice: Subject to any disclaimer, the term of this patent is extended or adjusted under 35 U.S.C. 154(b) by 193 days.

(21) Appl. No.: 11/908,782

(22) PCT Filed: Jun. 21, 2006

(86) PCT No.: PCT/KR2006/002380

§ 371 (c)(1),
(2), (4) Date: Sep. 14, 2007

(87) PCT Pub. No.: WO2006/137683

PCT Pub. Date: Dec. 28, 2006

(65) Prior Publication Data

US 2008/0113857 A1    May 15, 2008

(30) Foreign Application Priority Data

Jun. 22, 2005    (KR)    ............. 10-2005-0054044

(51) Int. Cl.
    C03C 3/078    (2006.01)
    C03C 3/085    (2006.01)
    C03C 3/087    (2006.01)
(52) U.S. Cl. .................... 501/69; 501/70; 501/72
(58) Field of Classification Search .............. 501/69, 501/72, 70
    See application file for complete search history.

(56) References Cited

U.S. PATENT DOCUMENTS

| 5,908,794 A | 6/1999 | Maeda et al. |
| 5,925,583 A * | 7/1999 | Yoshii et al. ............... 501/70 |
| 6,063,718 A * | 5/2000 | El Khiati et al. ............ 501/70 |

FOREIGN PATENT DOCUMENTS

| JP | 2000-72472 A | 3/2000 |
| JP | 2000-302474 A | 10/2000 |
| KR | 1996-7004417 A | 8/1996 |
| KR | 1997-0065450 A | 10/1997 |
| KR | 10-0215256 B1 | 8/1999 |
| KR | 2005045480 | * 5/2005 |
| WO | WO 95/32926 A1 | 12/1995 |

* cited by examiner

*Primary Examiner*—Karl E Group
(74) *Attorney, Agent, or Firm*—Birch, Stewart, Kolasch & Birch LLP

(57) ABSTRACT

The present invention relates to a glass substrate composition comprising $SiO_2$ 55~70 wt %, $Al_2O_3$ 0~1 wt %, $ZrO_2$ 0.1~5 wt %, $Na_2O$ 0.1~5 wt %, $K_2O$ 7~13 wt %, MgO 7~14 wt %, CaO 0~4 wt %, SrO 7~12 wt % and $SO_3$ 0.01~0.5 wt %. The glass substrate prepared by using the above composition shows less thermal deformation at a baking process under a high temperature since the strain point of the glass is at least 570° C., does not have such disadvantages as increase of fuel cost and short life cycle of refractories resulted from less than 1460° C. of melting point, and has $80~95\times10^{-7}/°$ C. of thermal expansion coefficient in the temperature range of 50~350° C. Therefore, the glass according to the present invention is suitable as a substrate.

8 Claims, 1 Drawing Sheet

US 7,670,976 B2

HIGH STRAIN-POINT GLASS COMPOSITION FOR SUBSTRATE

TECHNICAL FIELD

The present invention relates to a glass substrate for Flat Panel Display (FPD), in particular, a glass substrate composition for Plasma Display Panel (PDP). Specifically, the present invention relates to a glass substrate composition comprising $SiO_2$ 55~70 wt %, $Al_2O_3$ 0~1 wt %, $ZrO_2$ 0.1~5 wt %, $Na_2O$ 0.1~5 wt %, $K_2O$ 7~13 wt %, MgO 7~14 wt %, CaO 0~4 wt %, SrO 7~12 wt %, and $SO_3$ 0.01~0.5 wt %. The glass prepared by using the above composition shows less thermal deformation during a baking process at a high temperature because the strain point of the glass becomes to 570° C. or more which is much higher than that of soda lime glass used as a glass substrates for conventional plasma display panel. Also, the glass prepared by using the present composition does not have such disadvantages as increase of fuel cost and short life cycle of refractories since the melting point is less than 1460° C., and the thermal expansion coefficient in the temperature range of 50~350° C. is $80~95 \times 10^{-7}/°$ C. Therefore, the glass according to the present invention is suitable as a substrate.

BACKGROUND ART

PDP is a display device using luminescence at cross section of matrix electrode which is ranged as length and width by plasma discharge of inert gas. A typical PDP is composed of two glass sheets, i.e., front and rear glass sheets having a thickness of 2.8~3.0 mm which are sealed by glass frit. The indium tin oxide (ITO) as cathode is coated on an interior surface of the front glass sheet displaying images, and the Ni, Ag paste of anode and fluorescent material emitting red, green and blue colors are coated on an interior surface of the rear glass sheet.

In the beginning of PDP development, the size of a glass substrate was less than 20 inch, and soda lime glass widely used for building or automobile glass was commonly used. However, the more PDP development proceeds, the larger the PDP size becomes. Thus, such problems as size deformation by thermal expansion, and scratch during handling and processing became important.

Soda lime glass used for conventional glass substrate satisfied important properties for a glass substrate such as chemical stability, flatness, and optical properties. However, soda lime glass is not suitable for a glass substrate due to high thermal deformation rate and high content of $Na_2O$. Specifically, the strain point of soda lime glass is around 510° C., and thus thermal deformation or decrease of productivity may be easily occurred during heat-treating process. Another problem of soda lime glass is to have reactivity with Ag electrode in PDP electrodes. The reaction may generate a colloid of $Ag^0$ by ion permeation exchange between $Ag^+$ and $Na^+$ during heat treatment at a high temperature, and the generated colloid of $Ag^0$ may absorb the wavelength of UV range to induce yellowing phenomenon. Therefore, soda lime glass had a disadvantage that the above reaction should be inhibited by coating $SiO_2$ on a lower part of a substrate to prevent yellowing phenomenon. The reactivity between $Ag^+$ and alkali metal can be anticipated by measuring volume resistivity. That is, high volume resistivity means that the diffusion rate of alkali metal is low, and thus the yellowing phenomenon can be prevented by increasing the volume resistivity of a glass substrate. The volume resistivity of conventional soda lime glass is measured as about $10^9$ Ω·cm.

As described above, problems of conventional soda lime glass are the thermal deformation during heat treatment at a high temperature and the reactivity of $Ag^+$ electrode and alkali metal. To solve these problems, glass composition for a PDP glass substrate having a higher strain point 60~80° C. higher and a lower content of $Na_2O$ than conventional soda lime glass were developed. The strain point of glass may be increased by decreasing the content of alkali metal, with increasing the content of $Al_2O_3$. However, such change of components content inevitably induced increase of viscosity of glass at a high temperature, which result in a very unfavorable condition in a dissolution process of raw glass materials, a defoaming process of generated foam(fining process), and homogenization of glass melt. Therefore, there have been continuous efforts and new facility investments to solve these problems resulted from the increase of viscosity at a high temperature. The prior arts of glass composition for a substrate are explained in detail below.

Japanese Patent Laid-open Publication No. 03-40933 discloses a glass composition containing $SiO_2$, $Al_2O_3$, alkali metal oxide, alkali earth metal oxide, and $ZrO_2$. The composition is not deformed during heat treatment around 600° C., and has a similar thermal expansion coefficient to soda lime glass. However, this glass composition is very difficult to be practiced because the above Publication does not describe each specific amount of alkali metal oxide and alkali earth metal oxide, with only specifying total amounts. Also, the above composition further comprises $Sb_2O_3$ and $As_2O_3$ as fining agents to induce homogenization and defoaming. Excessive use of these components may cause corrosion of electrode or coloration of glass in an electric melting process.

Further, according to the Examples of the above Publication, the temperature is 1500° C. or more at the viscosity of glass melt of $10^2$ poise. The fining process of removing foam in the glass melt is carried out when the viscosity of the glass melt is in the range of $10~10^2$ poise. Thus, as the above temperature is low, the fining process can be easily carried out. In other words, as the temperature corresponding to an area that the viscosity of glass melt is in the range of $10~10^2$ poise is low, the fining process can be easily carried out. And, the fining process of conventional soda lime glass melt is carried out in the temperature range of 1400~1500° C., and the temperature of soda lime glass melt having the viscosity of $10^2$ poise is about 1420° C.

In short, in the above Publication, the temperature is 1500° C. or more at the viscosity of the glass melt of $10^2$ poise. This means that the fining process has to be carried out at a high temperature of greater than 100° C., compared with conventional soda lime glass. Thus, the composition of the above Publication has such disadvantages as increase of fuel cost and short life cycle of refractories. Further, if the defoaming process of removing foam generated in the melting furnace is carried out at a conventional process of producing soda lime glass, the decrease of product yield is inevitable due to fine foam, and thus an expensive complementary facility to supplement the decrease should be provided, which is another disadvantage of the composition of the Publication.

As an improved invention of the above described prior art, U.S. Pat. No. 5,599,754 mentions thermal expansion coefficient, transition temperature, and high temperature viscosity of a glass substrate composition, and discloses a process for producing glass by float method that is a flat glass production method. However, this process does not explain the strain point which is an essential property of a glass for PDP, and so the applicability is not sure. Also, in the Examples of this Patent, the temperature corresponding to the viscosity of glass melt of $10^2$ poise is also 1500° C. or more. Thus, the composition also has such disadvantages as increase of fuel cost and short life cycle of refractories.

Also, Japanese Patent Laid-open Publication No. 08-133778 discloses a glass composition consisting of $SiO_2$, alkali metal oxides, and alkali earth metal oxides. However, this glass composition does not comprise $ZrO_2$, and thus the increase of the strain point of glass is not significant, the generation of devitrification cannot be prevented, and the water resistance and chemical resistance of glass cannot be increased. Further, the Examples of this Publication show that the temperature corresponding to the viscosity of glass melt of $10^2$ poise is in the range of 1500~1560° C. Thus, this composition also has a couple of disadvantages such as excessive melt load and cost loss thereby.

Further, Japanese Patent Laid-open Publication No. 2004-035295 discloses a composition comprising 1~15% of MgO. However, this Publication does not provide data on the change of liquidus temperature according to the increase of MgO content, and a solution for defects according to the increase of devitrification tendency. Thus, the applicability of the composition is not sure. Therefore, production of a suitable glass substrate for high quality PDP seems to be difficult due to the devitrification defect which is inevitably accompanied in preparing flat glass.

DISCLOSURE OF THE INVENTION

To solve the problems of conventional glass composition as described above, the present inventor has developed a glass composition which has dimensional stability and flatness during heat treatment around 600° C. in the manufacturing of PDP, can use paste materials developed for preparing conventional soda lime flat glass in the same manner due to a similar level of thermal expansion coefficient to conventional soda lime flat glass, and also can overcome the disadvantages of prior glass substrate for PDP.

In the development process, it was observed that as the content of MgO was increased, the devitrification tendency was increased, and thus the liquidus temperature was increased. It is known in the art that the incidence of the devitrification defects is greatly increased when MgO is added to a glass composition over the level of 4~6% since MgO has the strongest affinity among alkali earth metals. The most typical crystal defection caused by the devitrification is diopside ($MgO.CaO.SiO_2$). And, the experiments showed that the incidence of the above defects is increased, as the content of MgO is increased. Thus, the present inventor carried out various experiments to inhibit this devitrification tendency, and verified that the devitrification tendency cannot be inhibited by general composition for a prior high strain point glass substrate. The present inventor could develop a novel composition in which the contents of $Al_2O_3$ and CaO are reduced, and confirmed that the composition can effectively prevent increase of the devitrification tendency which was inevitably accompanied by the increase of MgO content.

Therefore, the object of the present invention is to provide a glass substrate composition in which the strain point, a thermal deformation criterion of glass, is at least 570° C., and the thermal expansion coefficient is 80~95×$10^{-7}$/° C. which is a similar level to that of conventional soda lime glass. It is another object of the present invention to provide a glass substrate composition in which can effectively reduce the viscosity of glass at a high temperature by increasing the content of MgO to overcome the disadvantages of prior glass composition for conventional PDP, and the melting point can reduce less than 1460° C., and which can simultaneously achieve improvement of scratch resistance of glass substrate and inhibition of reactivity with Ag electrode.

According to the present invention, the glass substrate composition comprises $SiO_2$ 55~70 wt %, $Al_2O_3$ 0~1 wt %, $ZrO_2$ 0.1~5 wt %, $Na_2O$ 0.1~5 wt %, $K_2O$ 7~13 wt %, MgO 7~14 wt %, CaO 0~4 wt %, SrO 7~12 wt %, and $SO_3$ 0.01~0.5 wt %.

BEST MODE FOR CARRYING OUT THE INVENTION

Figure 1:
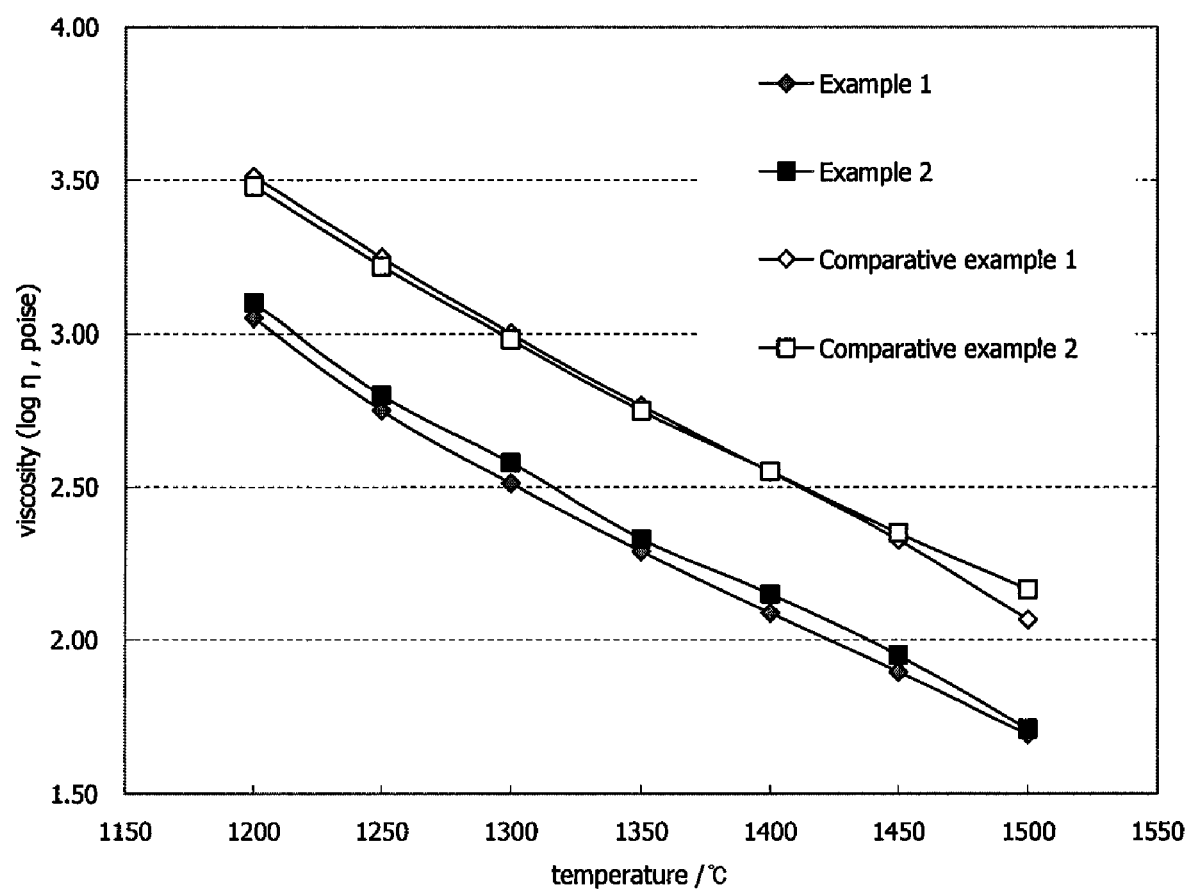
FIG. 1 represents a graph showing the high temperature viscosities of glass melt of Examples 1 and 2 and Comparative Examples 1 and 2 measured in the temperature range of 1200~1500° C.

The characteristics of the present invention are described in more detail hereinafter.

The glass composition for a PDP substrate according to the present invention can have the following characteristics by properly adjusting the kinds and contents of components. The present composition has dimensional stability and flatness when applied as glass substrate since the strain point becomes higher than 570° C., which is higher than that of soda lime glass applied as a conventional glass substrate for PDP. Thus, the present composition has less thermal deformation during baking process at a high temperature. Also, the melting point of the present composition is less than 1460° C., and so the present composition does not have such losses as increased fuel cost and short life cycle of refractories. Further, the present composition has 80~95×$10^{-7}$/° C. of thermal expansion coefficient in the temperature range of 50~350° C. which is similar to conventional soda lime glass, and so paste materials applied in preparing conventional soda lime flat glass can be applied in the same manner. Thus, the present composition is more suitable for PDP application.

Prior glass composition for a PDP substrate could satisfy the above mentioned properties, but had disadvantages of high melting point and the viscosity at a high temperature due to the low content of alkali metal and the high content of $Al_2O_3$. In comparison, the glass composition according to the present invention has less melting furnace load and excellent fining property since the present composition can make the melting point of glass and the high temperature viscosity of glass melt lower than conventional glass composition for a substrate, without increasing the content of $Na_2O$ which is a strong melting agent, by increasing the content of MgO to more than 7 wt %.

Further, the glass composition of the present invention is suitable for preparing a substrate by float process which is a conventional process for flat glass since the composition could overcome the increase of liquidus temperature due to the decrease of high temperature viscosity through appropriate component ratio constitution. Also, the glass composition of the present invention has good scratch resistance by adjusting the ratio of MgO/CaO to 8 or more, and has lowered reactivity of glass substrate with Ag electrode by adjusting the ratio of $K_2O/Na_2O$ to 2.5 or more.

Individual components of the present glass substrate composition are described more specifically hereinafter.

First, $SiO_2$ forms a network which is a basic structure of glass. If its content is less than 55 wt %, the structure of glass becomes unstable, and thus the chemical resistance or water resistance tends to be poor. And, if its content is more than 70 wt %, the yield is decreased due to such defect as devitrification that may be caused by the increased viscosity of glass at a high temperature and the poor meltability. The preferable content of $SiO_2$ is 59~67 wt %.

$Al_2O_3$ increases the viscosity at a high temperature, and can improve durability of glass when a small amount thereof is added. However, it was identified that the crystallization tendency is increased, as the content of $Al_2O_3$ is increased in the composition having a high content of MgO. Therefore, the optimal content of $Al_2O_3$ in the present composition is 0~1 wt %, but the preferable content of $Al_2O_3$ is less than 0.2 wt %.

$ZrO_2$ improves the water resistance, chemical resistance, and strain point of glass. In the glass composition of the present invention, 0.1~5 wt % of $ZrO_2$ is used. If the content is less than 0.1 wt %, the water resistance and chemical resistance of glass is decreased. If the content is more than 5 wt %, the crystallization may be easily developed, and the melting load may be increased due to the poor meltability. The preferable range of $ZrO_2$ content is 2.5~4 wt %.

It is preferable that the total content of $SiO_2+Al_2O_3+ZrO_2$ is 60~72 wt % of the total composition. If the total content is more than 72 wt %, the thermal expansion coefficient which is an important property for a glass substrate is decreased, and the refinability may be reduced, or the melting load may be increased due to the increased viscosity at a high temperature. If the content is less than 60 wt %, the content of alkali metal oxide becomes excessive, thereby increasing the specific gravity of glass, reducing the chemical resistance, and increasing the thermal expansion coefficient. The preferable content of $SiO_2+Al_2O_3+ZrO_2$ is 62~70 wt %.

$Na_2O$ is a component functioning as melting agent for the glass composition with $K_2O$, and is an essential component to modulate appropriate thermal expansion coefficient since it has a significant effect to the thermal expansion rate. In the glass composition of the present invention, 0.1~5 wt % of $Na_2O$ is used. If the content is less than 0.1 wt %, the homogenization tends to be poor due to the reduced meltability. If the content is more than 5 wt %, the thermal expansion coefficient is increased, the strain point of glass is decreased, and the water resistance and chemical resistance of glass are decreased. Also, it is preferable to maintain the content level low since it induces yellowing phenomenon resulted from the reaction with Ag electrode used for preparing of PDP. The preferable content of $Na_2O$ is 1~3.5 wt %.

$K_2O$ is a component adjusting the viscosity of a glass composition at high and low temperatures. It controls the migration of alkali ion in glass by a mixed alkali effect with $Na_2O$, and affects the electric conductivity of glass. The content of $K_2O$ used for the present composition is 7~13 wt %. If the content is less than 7 wt %, the meltability of glass is reduced, and if the content is more than 13 wt %, the thermal expansion rate of glass is increased, and the strain point is lowered. The preferable content of $K_2O$ is 9.0~12.5 wt %.

Also, to inhibit reactivity between alkali metal and Ag electrode, it is preferable to adjust the weight ratio of $K_2O/Na_2O$ to at least 2.5, more preferably 2.5~10.0. It was observed that the volume resistivity, a criterion of the reactivity between alkali metal and Ag electrode, is also increased when the weight ratio of $K_2O/Na_2O$ is adjusted to at least 2.5, and thus the reactivity with electrode is reduced as this value is increased. Also, if the value is more than 10, the cost of raw material is increased according to the increased content of $K_2O$. It is more preferable to adjust the weight ratio of $K_2O/Na_2O$ to 4~9.

MgO has a function to decrease the viscosity of glass composition at a high temperature range, and to increase the viscosity of glass composition at a low temperature range, and has an effect to increase the strain point of a glass composition. The content of MgO in the present glass composition is 7~14 wt %. If the content is more than 7 wt %, the fining process can be carried out at a low temperature range due to the reduced viscosity at a high temperature. However, if the content is more than 14 wt %, the liquidus temperature may be increased due to the reduced viscosity of glass at a high temperature, and the thermal expansion coefficient may be decreased. The preferable content of MgO is 8.0~11 wt %.

CaO has a similar function to MgO, and has an effect to reduce the viscosity of glass melt at a high temperature. If a composition has at least 7 wt % of MgO, it is preferable to use 0~4 wt % of CaO. If the content is more than 4 wt %, the crystallization may be easily developed. It is more preferable to use 0~2.9 wt % of CaO, and most preferable to use a very small amount of CaO, i.e., less than 1 wt %, in the present composition.

Also, it is preferable to adjust the weight ratio of MgO/CaO to 8 or more, more preferably 8 to 35. If the weight ratio of MgO/CaO is in the above range, the brittleness index, i.e., a standard for scratch resistance of glass, can be reduced due to the mixed ion effect from MgO and CaO, and the effect of reducing a density resulted from higher affinity of MgO in the glass network than other alkali earth metal, and the small ion radius.

SrO has a similar function to MgO and CaO, and is a representative alkali earth metal component like BaO. As the content of SrO is increased, increase of the strain point can be induced, and the alkali component inducing the yellowing phenomenon and reduction of the strain point can be replaced. The content of SrO used in the present composition is 7~12 wt %. If the content is less than 7 wt %, the effects of lowering the viscosity at a high temperature and the inhibition of crystallization is decreased when the glass is melted. If the content is more than 12 wt %, the strain point of glass is decreased, and the specific gravity is increased. The preferable content of SrO is 9.5~11.5 wt %.

Further, it is preferable that the total content of MgO+CaO+SrO is 15~24 wt % of the total composition. If the content is less than 15 wt %, the meltability of glass may be decreased, and the viscosity at a high temperature may be increased. If the content is more than 24%, the liquidus temperature or the weight of substrate may be increased due to the increased specific gravity of glass. It is more preferable that the total content of MgO+CaO+SrO is in the range of 17~22 wt %.

$SO_3$ is a fining agent which is essentially used for removing foam generated in the melting process of raw material. The amount of $SO_3$ used for the present composition is 0.01~0.5 wt %. To remove the foams, it is preferable to maintain the above range.

Also, the present invention may further comprise 1 wt % or less of $TiO_2$, $Fe_2O_3$, FeO, $As_2O_3$, $Sb_2O_3$, CoO, NiO, $Cr_2O_3$ or $CeO_2$.

The glass substrate of the present invention may be prepared by float process, slot down draw process, or overflow down draw process, all of which are well known as processes for preparing flat glass.

The present invention is exemplified more specifically by the following examples. However, the scope of the present invention is not limited thereby in any way.

EXAMPLES 1~7 AND COMPARATIVE EXAMPLES 1~5

The components of a glass composition were mixed in a platinum crucible and heated to 1550° C. to melt them for 4 hours. To homogenize the glass composition during the melting process, the mixture was stirred by platinum stirrer for 30 minutes. The molten glass composition was poured into a metal or graphite plate to form a plate type, and then annealed at a temperature above the annealing point to prepare a glass. The content of each component and the data on physical properties of each glass composition are shown in Table 1. Comparative Example 5 shows the composition of conventional soda lime glass and data thereof.

The thermal expansion coefficient, strain point, liquidus temperature, melting point, brittleness index, and volume resistivity of glass specimens prepared by Examples 1~7 and Comparative Examples 1~5 as shown in Table 1 are measured by the following methods:

Thermal expansion coefficient is a value showing a relative expansion rate of specimen to a prior length, and was measured by Dilatometer in the temperature range of 50~350° C. according to DIN 51045.

The strain point is a temperature that glass deformation is initiated, and means a temperature at which it takes 16 hours to relieve the stress generated from heat treatment. Here, the strain point corresponding to $10^{14.5}$ poise of glass viscosity is measured according to ASTM C598-88.

brittleness index to glass is because it is difficult to accurately evaluate the fracture toughness (Kc). Several methods to overcome such difficulty of measuring Kc value identified that the brittleness index is in inverse proportion to Kc. The brittleness index can be quantitatively measured from the relation between the size of a mark of an indenter left on a glass surface when the Vickers indenter was pressed against the glass surface, and the length of crack formed from the four corners of the mark. It has been reported that the incidence of scratch due to a load provided from outside is reduced as the brittleness index is decreased. The brittleness index was measured by Vickers hardness meter according to the method described in Journal of Non-crystalline Solids 253 (1999) 126-132.

The volume resistivity is an electrical property representing the resistance of glass. Here, the volume resistivity was measured according to ASTM C657, based on the value measured at 150° C. The volume resistivity shows electrical resistance of glass as well as criterion which can expect reactivity between alkali metal and Ag electrode coated on the upper surface of glass substrate of PDP. As the above value is increased, the reactivity between Ag electrode and alkali metal is decreased, and so yellowing phenomenon due to $Ag^0$ colloid may be inhibited.

TABLE 1

| Component (wt %) | Examples | | | | | | | Comparative Examples | | | | |
| --- | --- | --- | --- | --- | --- | --- | --- | --- | --- | --- | --- | --- |
| | 1 | 2 | 3 | 4 | 5 | 6 | 7 | 1 | 2 | 3 | 4 | 5 |
| $SiO_2$ | 60.0 | 67.3 | 62.7 | 63.0 | 67.0 | 64.8 | 65.9 | 59.5 | 55.5 | 60.5 | 61.4 | 71.0 |
| $Al_2O_3$ | 0.5 | 0.3 | 0 | 0.1 | 0.3 | 0.2 | 0.8 | 7.0 | 7.5 | 2.3 | 1.3 | 1.1 |
| $ZrO_2$ | 3.5 | 3.9 | 3.7 | 3.7 | 3.5 | 3.8 | 3.3 | 2.0 | 4.0 | 1.7 | 2.4 | 0 |
| $Na_2O$ | 3.9 | 2.2 | 3.5 | 1.9 | 2.2 | 2.4 | 2.1 | 4.8 | 4.5 | 5.0 | 4.5 | 13.9 |
| $K_2O$ | 11.5 | 7.5 | 9.5 | 7.6 | 7.2 | 7.0 | 8.8 | 6.2 | 7.0 | 9.0 | 8.6 | 0.3 |
| MgO | 12.3 | 10.6 | 12.7 | 13.4 | 8.7 | 12.7 | 10.1 | 2.3 | 3.0 | 11.4 | 12.3 | 3.8 |
| CaO | 0.5 | 0.5 | 0.4 | 0.4 | 0.7 | 0.6 | 0.8 | 5.2 | 2.5 | 5.1 | 4.1 | 9.7 |
| SrO | 7.5 | 7.5 | 7.2 | 9.6 | 10.2 | 8.2 | 7.9 | 5.8 | 7.5 | 4.8 | 5.2 | 0 |
| BaO | 0 | 0 | 0 | 0 | 0 | 0 | 0 | 7.1 | 8.3 | 0 | 0 | 0 |
| $SO_3$ | 0.3 | 0.2 | 0.3 | 0.3 | 0.2 | 0.3 | 0.3 | 0.1 | 0.2 | 0.2 | 0.2 | 0.2 |
| $K_2O/Na_2O$ | 2.9 | 3.4 | 2.7 | 4.0 | 3.3 | 2.9 | 4.2 | 1.3 | 1.6 | 1.8 | 1.9 | 0.02 |
| MgO/CaO | 24.6 | 21.2 | 31.8 | 33.5 | 12.4 | 21.2 | 12.6 | 0.4 | 1.2 | 2.2 | 3.0 | 0.4 |
| Thermal expansion coefficient ($\times 10^{-7}/°$ C.) | 87 | 82 | 86 | 80 | 81 | 81 | 83 | 83 | 81 | 85 | 82 | 81 |
| Strain point (° C.) | 579 | 580 | 575 | 590 | 585 | 588 | 582 | 575 | 579 | 576 | 573 | 510 |
| Liquidus temperature (° C.) | 1048 | 1041 | 1030 | 1037 | 1042 | 1045 | 1070 | 1050 | 1039 | 1213 | 1202 | 1045 |
| Melting point (° C.) | 1445 | 1436 | 1447 | 1450 | 1448 | 1439 | 1442 | 1540 | 1545 | 1452 | 1449 | 1425 |
| Brittleness index ($m^{-1/2}$) | 6730 | 6790 | 6530 | 6540 | 6500 | 6810 | 6900 | 7460 | 7530 | 7250 | 7150 | 7100 |
| Log volume resistivity ($\Omega \cdot cm$) | 12.5 | 13.0 | 12.6 | 13.6 | 13.3 | 13.1 | 12.8 | 11.5 | 11.7 | 12.3 | 11.9 | 8.9 |

The liquidus temperature is defined as a maximum temperature at which crystal can be formed in glass, and was measured by using gradient furnace which can set temperature gradient in an electrical furnace according to ASTM C829-81.

The melting point is a temperature at which the viscosity of glass melt is $10^2$ poise, and was measured according to DIN 52312. The lower the temperature is, the easier the fining process can be carried out. That is, the higher the temperature corresponding to the viscosity of glass melt of $10^2$ poise is, the more difficult the rise of foam inevitably generated in glass is, and thus the more difficult the removing of fine foam is. The viscosity in the range of 1200° C.~1500° C. was also measured in the same manner.

The brittleness index is known as a representative property showing scratch resistance of glass. The reason to apply the As shown in the above Table 1, the thermal expansion coefficient of all glass specimen prepared by the composition of Examples 1~7 are in the range of $80 \sim 95 \times 10^{-7}/°$ C., and the strain point is at least 570° C. They show that these properties are suitable for preparing a glass applied to a glass substrate for PDP and have sufficient properties applicable to a glass substrate for PDP.

Also, as for the melting point at which the viscosity of glass melt is $10^2$ poise, it is verified that the temperatures of the present compositions are lower than those of conventional glass composition for a glass substrate for PDP by about 90~109° C. That is, the melting point of the glass according to the present invention is less than 1460° C., which is a similar level to soda lime glass. Thus, the present composition can overcome such disadvantages as difficulty in the fining process or melting load due to the increased viscosity at a high temperature which are the problems of conventional glass substrate composition.

The viscosity distributions in the high temperature range (1200~1500° C.) are shown in FIG. 1. As shown in FIG. 1, Examples 1 and 2 show lower viscosity at the same temperature as Comparative Examples 1 and 2.

As for the strain point and thermal expansion coefficient, in Comparative Examples 3 and 4, the melting point of glass could be lowered to that of soda lime glass by increasing the content of MgO, with satisfying the required properties for a glass substrate. However, the liquidus temperature were increased to more than 1200° C. due to the increased contents of $Al_2O_3$ and CaO. In this case, the incidence of devitrification defects may be rapidly increased, thereby reducing the production yield of a glass substrate that essentially requires high transmissivity and minimum defects.

Comparative Example 5 shows a conventional soda lime glass composition, wherein the thermal expansion coefficient meets the required level. However, the strain point is around 510° C., and so the dimensional stability is decreased remarkably in the baking process of 570~600° C., and the material deposited on the upper surface of the substrate can be peeled due to the deformation of glass.

In case the weight ratio of MgO/CaO in Examples 1 to 7 are 8 or more, the brittleness index are increased to 6500~6900 $m^{-1/2}$. This means that the incidence of scratch from other reasons or outside load is decreased. On the other hand, Comparative Examples have 7100~7530 $m^{-1/2}$ of brittleness index, which are weaker level to scratch than the Examples according to the present invention. Thus, Comparative Examples 1 and 2 show that the fraction defect due to scratch may be increased at the time of preparation, processing, and treatment of glass substrate.

In case of Examples 1 to 7, when the weight ratio of $K_2O/Na_2O$ was adjusted to at least 2.5, the volume resistivity reached the range of $10^{12.5}$~$10^{13.6}$ Ω·cm. However, Comparative Examples 1, 2 and 5 show $10^{8.9}$~$10^{11.7}$ Ω·cm of volume resistivity. Therefore, the present invention can increase the volume resistivity to conventional PDP glass substrate by increasing the weight ratio of $K_2O/Na_2O$ to at least 2.5, and can effectively prevent reactivity between Ag electrode and alkali metal.

INDUSTRIAL APPLICABILITY

The glass substrate composition according to the present invention has compatibility with conventional paste material since the composition has 80~95×$10^{-7}$/° C. of thermal expansion coefficient in the temperature range of 50~350° C. which is similar to conventional soda lime glass, and has superior heat resistance, i.e, dimensional stability during baking process at a high temperature since the strain point is at least 570° C., and can be prepared by conventional float process. Therefore, the present composition has sufficient properties applicable to a glass substrate for PDP.

Also, the present composition can lower the viscosity at a high temperature and the melting point of glass melt to a similar level to soda lime glass by increasing the content of MgO to at least 7%, and thus has good fining property and reduced load of melt furnace.

Further, the present composition has a low brittleness index by adjusting the weight ratio of MgO/CaO to at least 8, and lowered the reactivity between Ag electrode and alkali metal by adjusting the weight ratio of $K_2O/Na_2O$ to at least 2.5.

The invention claimed is:

1. A glass composition comprising $SiO_2$ 55~70 wt %, $Al_2O_3$ 0~1 wt %, $ZrO_2$ 0.1~5 wt %, $Na_2O$ 0.1~5 wt %, $K_2O$ 7~13 wt %, MgO 8~14 wt %, CaO 0~less than 1 wt %, SrO 7~12 wt %, and $SO_3$ 0.01~0.5 w %, wherein the weight ratio of MgO/CaO is 8 or more.

2. The glass composition of claim 1, wherein the total content of $SiO_2+Al_2O_3+ZrO_2$ is 60~72 wt % of the total composition.

3. The glass composition of claim 1, wherein the total content of MgO+CaO+SrO is 15~24 wt % of the total composition.

4. The glass composition of claim 1, wherein the weight ratio of MgO/CaO is 8~35.

5. The glass composition of claim 1, wherein the weight ratio of $K_2O/Na_2O$ is 2.5~10.0.

6. A glass substrate comprising the glass composition of claim 1, wherein the thermal expansion coefficient is in the range of 80~95×$10^{-7}$/° C. in the temperature range of 50~350° C., the strain point is at least 570° C., and the melting point is less than 1460° C.

7. A glass substrate composition for a plasma display panel having a high thermal deformation criteria of at least 570° C. and simultaneously a reduced melting point of less than 1460° C. which comprises:
   55 to 70 wt % $SiO_2$,
   7 to 13 wt % $K_2O$,
   8 to 14 Wt % MgO,
   7 to 12 wt % SrO,
   0 to less than 1 wt % CaO,
   0 to 1 wt % $Al_2O_3$,
   0.1 to 5 wt % $ZrO_2$,
   0.1 to 5 wt % $Na_2O$, and
   0.01 to 0.5 wt % $SO_3$, wherein the weight ratio of MgO/CaO is 8 or more.

8. The glass substrate composition of claim 7, wherein the weight ratio of MgO/CaO is 8 to 35.

* * * * *